(12) United States Patent
Wang

(10) Patent No.: US 9,244,754 B2
(45) Date of Patent: Jan. 26, 2016

(54) ERROR CODE CONVERSION METHOD AND SYSTEM, PPPOE SERVER AND MOBILE TERMINAL

(71) Applicant: ZTE Corporation, Shenzhen, Guangdong (CN)

(72) Inventor: Bin Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/414,827

(22) PCT Filed: Jul. 12, 2013

(86) PCT No.: PCT/CN2013/079323
§ 371 (c)(1),
(2) Date: Jan. 14, 2015

(87) PCT Pub. No.: WO2013/170818
PCT Pub. Date: Nov. 21, 2013

(65) Prior Publication Data
US 2015/0135022 A1    May 14, 2015

(30) Foreign Application Priority Data
Sep. 18, 2012    (CN) .......................... 2012 1 0345505

(51) Int. Cl.
*G06F 11/00* (2006.01)
*G06F 11/07* (2006.01)
(Continued)

(52) U.S. Cl.
CPC .......... *G06F 11/0769* (2013.01); *G06F 11/079* (2013.01); *G06F 11/0766* (2013.01);
(Continued)

(58) Field of Classification Search
CPC ............ G06F 11/0769; G06F 17/2705; G06F 11/0766; G06F 11/0787; G06F 11/079; G06F 11/327
See application file for complete search history.

(56) References Cited

U.S. PATENT DOCUMENTS

| 6,636,505 | B1 | 10/2003 | Wang | |
|---|---|---|---|---|
| 7,295,882 | B2 * | 11/2007 | Champion | .......... G06F 11/0706 700/94 |

(Continued)

FOREIGN PATENT DOCUMENTS

| CN | 101072128 A | 11/2007 |
|---|---|---|
| CN | 101197722 A | 6/2008 |

(Continued)

OTHER PUBLICATIONS

International Search Report in international application No. PCT/CN2013/079323, mailed on Oct. 31, 2013.

(Continued)

*Primary Examiner* — Charles Ehne
(74) *Attorney, Agent, or Firm* — Oppedahl Patent Law Firm LLC

(57) ABSTRACT

Disclosed are an error code conversion method and system, a Point-to-Point Protocol over Ethernet (PPPoE) server and a mobile terminal, and the method includes: a PPPoE server parses a PPPoE error code generated during a dialup process, converts the PPPoE error code to an extended error code according to a PPPoE error code conversion rule table preconfigured on the PPPoE server and transmits the extended error code to a mobile terminal; the mobile terminal receives the extended error code, interprets the extended error code into a plain text according to a PPPoE error code conversion rule table configured on the mobile terminal in advance and displays the plain text to a user. The present disclosure improves capability of a PPPoE server and a terminal for processing errors, thus making it convenient for the mobile terminal and an operator to control a PPPoE dialup process and for a user to surf the Internet through WiFi by rapidly using PPPoE dialup functionality.

14 Claims, 2 Drawing Sheets

(51) Int. Cl.
*G06F 11/32* (2006.01)
*H04L 29/06* (2006.01)
*H04L 12/28* (2006.01)
*H04L 12/24* (2006.01)
*G06F 17/27* (2006.01)
*H04L 12/413* (2006.01)

(52) U.S. Cl.
CPC .......... *G06F11/0787* (2013.01); *G06F 11/327* (2013.01); *G06F 17/2705* (2013.01); *H04L 12/28* (2013.01); *H04L 12/2859* (2013.01); *H04L 12/413* (2013.01); *H04L 29/06* (2013.01); *H04L 41/06* (2013.01); *H04L 41/5067* (2013.01); *H04L 69/08* (2013.01)

(56) References Cited

U.S. PATENT DOCUMENTS

| | | |
|---|---|---|
| 2003/0225827 A1 | 12/2003 | Andersen |
| 2005/0015644 A1 | 1/2005 | Chu |
| 2008/0028264 A1* | 1/2008 | Kerner ................ G06F 11/0727 714/42 |
| 2011/0197090 A1* | 8/2011 | Colbert ............... G06F 11/0766 714/2 |
| 2011/0320884 A1* | 12/2011 | Thilagar ............. G06F 11/0709 714/48 |

FOREIGN PATENT DOCUMENTS

| | | |
|---|---|---|
| CN | 101262368 A | 9/2008 |
| CN | 101453359 A | 6/2009 |
| CN | 102891785 A | 1/2013 |
| EP | 1501240 A2 | 1/2005 |
| KR | 20070073379 A | 7/2007 |

OTHER PUBLICATIONS

English Translation of the Written Opinion of the International Search Authority in international application No. PCT/CN2013/079323, mailed on Oct. 31, 2013.

Supplementary European Search Report in European application No. 13790684.8, mailed on Jun. 19, 2015.

\* cited by examiner

ERROR CODE CONVERSION METHOD AND SYSTEM, PPPOE SERVER AND MOBILE TERMINAL

TECHNICAL FIELD

The present disclosure relates to the field of mobile communications, and in particular to an error code conversion method and system, a Point-to-Point Protocol over Ethernet (PPPoE) server and a mobile terminal.

BACKGROUND

As the rapid development of mobile communications and mobile terminals and particularly the popularity of smart mobile terminals, it becomes one of basic necessities in the era of smart mobile terminals for people to access WiFi so as to surf the Internet, browse web pages, download data and watch online videos. Both WiFi hotspots at home and WiFi hotspots deployed in shopping malls by operators can only be accessed after identity authentication of a subscriber. Regardless of a broadband subscriber or a mobile subscriber, the subscriber generally needs to have an account and a password by which he/she can access the Internet and use network services after inputting them. A PPPoE dialup authentication approach is an approach for authenticating through an account and a password provided by an operator.

The PPPoE is a network tunneling protocol that encapsulates the Point-to-Point Protocol (PPP) into an Ethernet framework. Since the PPP is integrated into the PPPoE, it can implement functions that can't be provided by a traditional Ethernet such as identity authentication, encryption, compression and the like, and also applies to protocol systems providing subscribers with access services by using an Ethernet protocol, such as a cable modem, Digital Subscriber Line (DSL) and the like. Such a standard connection having a login and command also facilitates accounting by an access provider.

For charges and profit model considerations, operators a new generation of home gateway product, i.e., ADSL access box, also referred to as ADSL Modem. Such a device has functionality of a WiFi access point, but a mobile terminal using the device can't work, due to its bridging mode, through being authenticated only once, which is the case for ordinary routing devices. However devices accessing the Internet through ADSL access boxes are required to be authenticated separately. Existing mobile terminals generally haven't PPPoE dialup functionality, which brings inconvenience for the mobile terminals to access the Internet through a PPPoE approach. In addition, PPPoE error codes specified in the protocol are not abundant enough, and not friendly enough for operators and users of mobile terminals, while most major operators also have a set of error codes defined by themselves, thus an error code conversion needs to be performed and a method and system for managing error codes are desired accordingly.

SUMMARY

Embodiments of the present disclosure are intended to provide an error code to conversion method and system, a PPPoE server and a mobile terminal so as to solve a problem that it is desired to convert and manage an error code in the prior art.

In order to solve the above problem, according to one aspect, embodiments of the present disclosure provide an error code conversion method, and the method includes:

a Point-to-Point Protocol over Ethernet (PPPoE) server parses a PPPoE error code generated during a dialup process, converts the PPPoE error code to an extended error code according to a PPPoE error code conversion rule table preconfigured on the PPPoE server and transmits the extended error code to a mobile terminal;

the mobile terminal receives the extended error code, interprets the extended error code into a plain text according to a PPPoE error code conversion rule table preconfigured on the mobile terminal and displays the plain text to a user.

In an embodiment, the method may further include:

after updating the PPPoE error code conversion rule table configured on the PPPoE server, the PPPoE server transmits a synchronization update message to the mobile terminal;

the mobile terminal updates the PPPoE error code conversion rule table configured on the mobile terminal according to the synchronization update message.

In an embodiment, the dialup process may include:

completing human-machine interaction and collecting an account and its corresponding password inputted by the user performing PPPoE dialup;

managing various states of the PPPoE dialup process, triggering a PPPoE protocol stack to operate and being in charge of processing and executing PPPoE dialup instructions transmitted by the mobile terminal so as to complete management of the various states of the PPPoE dialup process; and implementing a WiFi connection, establishing a data link and querying a network status in a PPPoE dialup process.

According to another aspect, embodiments of the present disclosure further provide an error code conversion system including a PPPoE server and a mobile terminal, wherein the PPPoE server includes:

a parsing module configured to parse a PPPoE error code generated during a dialup process;

a conversion module configured to convert the PPPoE error code to an extended error code according to a PPPoE error code conversion rule table preconfigured on the PPPoE server;

a transmission module configured to transmit the extended error code to the mobile terminal;

the mobile terminal comprises:

a reception module configured to receive the extended error code;

an interpretation module configured to interpret the extended error code into a plain text according to a PPPoE error code conversion rule table preconfigured on the mobile terminal; and a display module configured to display the plain text to a user.

In an embodiment, the PPPoE sever may further include:

an update synchronization module configured to, after updating the PPPoE error code conversion rule table configured on the PPPoE server, transmit a synchronization update message to the mobile terminal;

the mobile terminal may further include:

an update module configured to update the PPPoE error code conversion rule table configured on the mobile terminal according to the synchronization update message.

In an embodiment, the mobile terminal may further include:

a dialup access module configured to complete human-machine interaction and collect an account and its corresponding password inputted by the user performing PPPoE dialup;

a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and a network management module configured to implement a WiFi connection, establish a data link and query a network status during a PPPoE dialup process.

According to yet another aspect, embodiments of the present disclosure further provide a PPPoE server including:

a parsing module configured to parse a PPPoE error code generated during a dialup process;

a conversion module configured to convert the PPPoE error code to an extended error code according to a PPPoE error code conversion rule table preconfigured on the PPPoE server; and a transmission module configured to transmit the extended error code to a mobile terminal.

In an embodiment, the PPPoE sever may further include:

an update synchronization module configured to, after updating the PPPoE error code conversion rule table configured on the PPPoE server, transmit a synchronization update message to the mobile terminal.

According to still another aspect, embodiments of the present disclosure further provide a mobile terminal including:

a reception module configured to receive an extended error code;

an interpretation module configured to interpret the extended error code into a plain text according to a PPPoE error code conversion rule table preconfigured on the mobile terminal; and a display module configured to display the plain text to a user.

In an embodiment, the mobile terminal may further include:

an update module configured to update the PPPoE error code conversion rule table configured on the mobile terminal according to the synchronization update message.

In an embodiment, the mobile terminal may further include:

a dialup access module configured to complete human-machine interaction and collect an account and its corresponding password inputted by the user performing PPPoE dialup;

a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and a network management module configured to implement a WiFi connection, establish a data link and query a network status during a PPPoE dialup process.

Beneficial effects of embodiments the present disclosure are as follows:

Embodiments of the present disclosure design a method for managing error codes aiming at a PPPoE dialup functionality built in a mobile terminal, which improves capability of a PPPoE server and a terminal for processing errors, thus making it convenient for the mobile terminal and an operator to control a PPPoE dialup process and for a user to surf the Internet through WiFi by rapidly using PPPoE dialup functionality.

DETAILED DESCRIPTION

The present disclosure will be further elaborated below in combination with accompanying drawings and embodiments. It should be understood that the specific embodiments are only used to interpret the present disclosure instead of limiting the present disclosure.

If an error occurs during a network connection approach, a PPPoE server will return an error code to a mobile terminal, and then the mobile terminal will process the returned error code. However, as the variation and upgrade of network environments, newly-generated error codes can't be updated in time, what can be done is only software upgrade performed respectively on a server side (PPPoE server) and on a client side (mobile terminal), and this also results in consumption of manpower and material resources. Embodiments of the present disclosure are intended to provide an error code conversion and management method so as to solve above problems.

Figure 1:
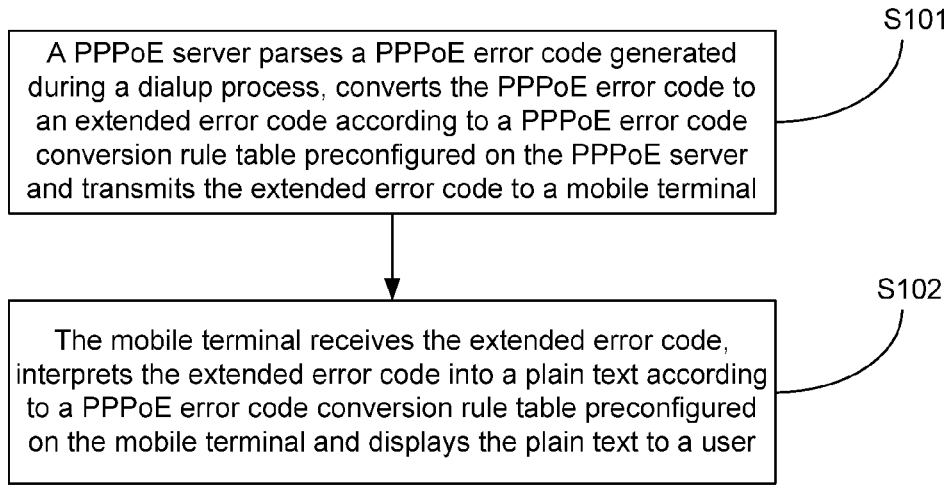
FIG. 1 is a flow chart of an error code conversion method according to an embodiment of the present disclosure.

As shown in FIG. 1, embodiments of the present disclosure relate to an error code conversion method, and the method includes:

Step S101, a PPPoE server parses a PPPoE error code generated during a dialup process, converts the PPPoE error code to an extended error code according to a PPPoE error code conversion rule table preconfigured on the PPPoE server and transmits the extended error code to a mobile terminal;

Before this step, a error relationship correspondence rule table, namely a PPPoE error code conversion rule table, needs to be maintained in advance in the PPPoE server and the client, and an error code fed back from a network can be retrieved in the PPPoE error code conversion rule table.

The extended error code refers to an error code converted by the PPPoE conversion.

The PPPoE error code conversion rule table includes a pre-configured conversion rule including: one PPPoE error code is converted to one extended error code (one-to-one for short), one PPPoE error code is converted to many extended error codes (one-to-many for short), many PPPoE error codes are converted to one extended error code (many-to-one for short) and other cases. For example, a standard PPPoE error code 691 represents an authentication failure, if the conversion rule is set to one-to-one, after conversion processing the PPPoE error code 691 will be converted into the form of 100011 for the use of a server or mobile terminal. If the conversion rule is set to one-to-many, for example an error code defined by a server (1000, link failure) may include different sub error codes corresponding to different specific causes as follows: 100022 (password error), 100033 (password overdue), 100044 (server busy), 100055 (invalid account), 100066 (account lockout) and the like, converted error codes are error codes that can be recognized by multiple servers and mobile terminals. As to the conversion rule being many-to-one, one example may be that, during a PPPoE dialup process, error codes for indicating network conditions, a port mapping error and a data link anomaly are defined unifiedly as a network connection error and converted into one extended error code for being fed back to a mobile terminal. Herein an extended error code after the conversion is an error code that can be recognized by a PPPoE server and a mobile terminal.

After the PPPoE error code conversion rule table is set, when an error code is generated during a dialup process, a PPPoE server parses the PPPoE error code generated during the dialup process, then retrieves the error code in the PPPoE error code conversion rule table, converts the PPPoE error code into a corresponding extended error code and transmits the extended error code to a mobile terminal.

Step S102, the mobile terminal receives the extended error code, interprets the extended error code into a plain text according to a PPPoE error code conversion rule table preconfigured on the mobile terminal and displays the plain text to a user.

In this step, the PPPoE error code conversion rule table is set in advance on the mobile terminal, after receiving an extended error code, the mobile terminal implements conversion processing according to a conversion rule in the PPPoE error code conversion rule table, it can interpret a PPPoE standard digital error code into specific plain text, that is to say, convert the error code into information that can be understood by a user of the mobile terminal, such as in the format of text, number, character string, image, voice and network linkage for user convenience.

In addition, in the above method after updating the PPPoE error code conversion rule table configured on the PPPoE server, the PPPoE server transmits a synchronization update message to the mobile terminal. The updating by the PPPoE server the PPPoE error code conversion rule table includes adding, deleting error codes and modifying existing error codes.

According to a synchronization update message, the mobile terminal updates the PPPoE error code conversion rule table configured on the mobile terminal so that the PPPoE error code conversion rule table stored in itself is the same as a PPPoE error code conversion rule table configured on the PPPoE server.

In addition, when a mobile terminal performs a PPPoE dialup, below steps are further included:

1) Dialup Access: in charge of implementing a human-machine interaction and collecting an account and a password inputted by the user performing PPPoE dialup;

2) State Management: managing various states of the PPPoE dialup process, triggering a PPPoE protocol stack to operate and being in charge of processing and executing PPPoE dialup instructions transmitted by the mobile terminal so as to complete management of the various states of the PPPoE dialup process;

3) Error Processing: processing various anomalies occurring during the dialup and providing a user with a friendly prompt and explanation. For detailed description of this step, refer to steps S101 and S102 in the above method.

4) a network management module is in charge of basic functions such as implementing a WiFi connection, establishing a data link and querying a network status during a PPPoE dialup process.

Figure 2:
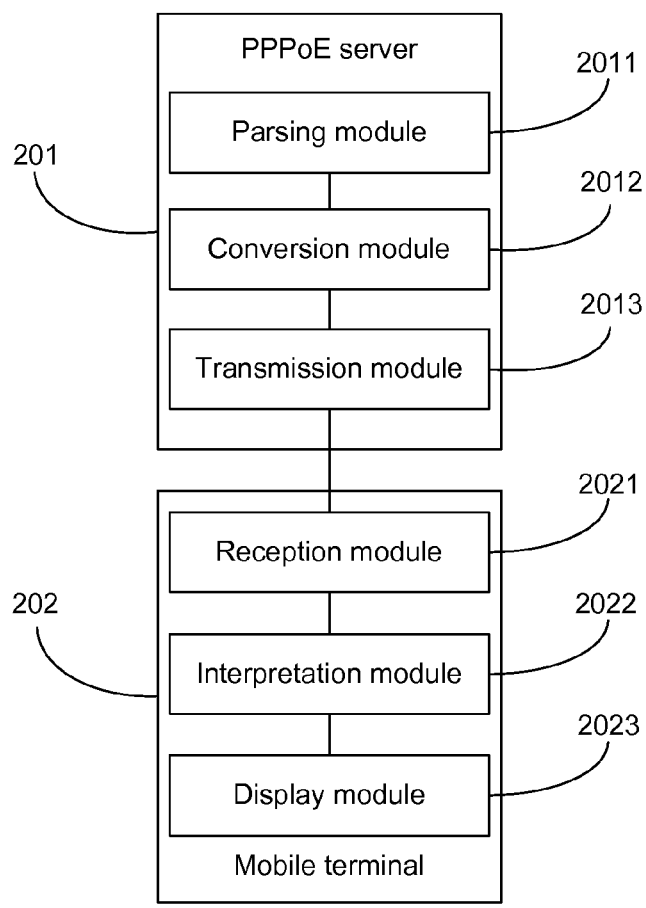
FIG. 2 is a schematic structural diagram of an error code conversion system according to an embodiment of the present disclosure.
Figure 3:
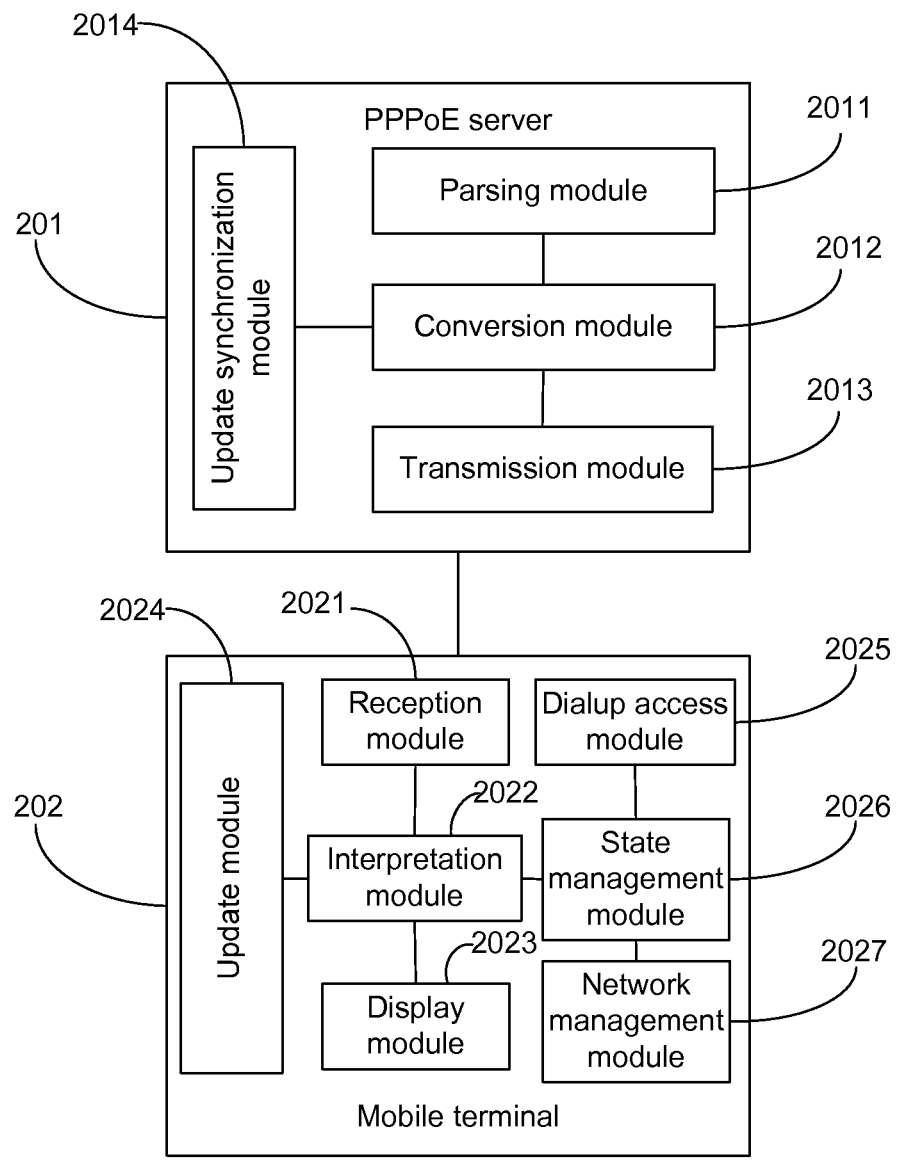
FIG. 3 is a schematic structural diagram of an error code conversion system according to another embodiment of the present disclosure.

In addition, as shown in FIGS. 2 and 3, embodiments of the present disclosure further relate to an error code conversion system including a PPPoE server 201 and a mobile terminal 202, wherein the PPPoE server 201 includes:

a parsing module 2011 configured to parse a PPPoE error code generated during a dialup process;

a conversion module 2012 configured to convert the PPPoE error code to an extended error code according to a PPPoE error code conversion rule table preconfigured on the PPPoE server; and a transmission module 2013 configured to transmit the extended error code to a mobile terminal;

the mobile terminal 202 includes:

a reception module 2021 configured to receive an extended error code;

an interpretation module 2022 configured to interpret the extended error code into a plain text according to a PPPoE error code conversion rule table preconfigured on the mobile terminal; and a display module 2023 configured to display the plain text to a user.

To achieve better technical effects, the PPPoE server 201 further includes:

an update synchronization module 2014 configured to, after updating the PPPoE error code conversion rule table configured on the PPPoE server, transmit a synchronization update message to the mobile terminal;

the mobile terminal 202 further includes:

an update module 2024 configured to update the PPPoE error code conversion rule table configured on the mobile terminal according to the synchronization update message.

The mobile terminal 202 further includes:

a dialup access module 2025 configured to complete a human-machine interaction and collect an account and a password inputted by the user performing PPPoE dialup;

a state management module 2026 configured to manage various states of the PPPoE dialup process, trigger a PPPoE protocol stack to operate and be in charge of to processing and executing PPPoE dialup instructions transmitted by the mobile terminal so as to complete management of the various states of the PPPoE dialup process; and a network management module 2027 configured to implement a WiFi connection, establish a data link and query a network status during a PPPoE dialup process.

It can be seen from above embodiments that embodiments of the present disclosure design a method for managing error codes aiming at a PPPoE dialup functionality built in a mobile terminal, which improves capability of a PPPoE server and a terminal for processing errors, thus making it convenient for the mobile terminal and an operator to control a PPPoE dialup process and for a user to surf the Internet through WiFi by rapidly using PPPoE dialup functionality.

Although preferred embodiments of the present disclosure are disclosed for purpose of illustration, it should be appreciated by those skilled in the art that various modifications, additions and substitutions are possible, thus the scope of the present disclosure should not be limited to the above embodiments.

The invention claimed is:

1. An error code conversion method, comprising:
parsing, by a Point-to-Point Protocol over Ethernet (PPPoE) server, a PPPoE error code generated during a dialup process, converting the PPPoE error code to an extended error code according to a PPPoE error code conversion rule table preconfigured on the PPPoE server and transmitting the extended error code to a mobile terminal;
receiving, by the mobile terminal, the extended error code, interpreting the extended error code into a plain text according to a PPPoE error code conversion rule table preconfigured on the mobile terminal and displaying the plain text to a user.

2. The error code conversion method according to claim 1, further comprising:
after updating the PPPoE error code conversion rule table configured on the PPPoE server, transmitting, by the PPPoE server, a synchronization update message to the mobile terminal;
updating, by the mobile terminal, the PPPoE error code conversion rule table configured on the mobile terminal according to the synchronization update message.

3. The error code conversion method according to claim 2, wherein the dialup process comprises:
   completing a human-machine interaction and collecting an account and a password inputted by the user performing PPPoE dialup;
   managing various states of the PPPoE dialup process, triggering a PPPoE protocol stack to operate and being in charge of processing and executing PPPoE dialup instructions transmitted by the mobile terminal so as to complete management of the various states of the PPPoE dialup process; and
   implementing a WiFi connection, establishing a data link and querying a network status during the PPPoE dialup process.

4. The error code conversion method according to claim 1, wherein the dialup process comprises:
   completing a human-machine interaction and collecting an account and a password inputted by the user performing PPPoE dialup;
   managing various states of the PPPoE dialup process, triggering a PPPoE protocol stack to operate and being in charge of processing and executing PPPoE dialup instructions transmitted by the mobile terminal so as to complete management of the various states of the PPPoE dialup process; and
   implementing a WiFi connection, establishing a data link and querying a network status during the PPPoE dialup process .

5. An error code conversion system, comprising a Point-to-Point Protocol over Ethernet (PPPoE) server and a mobile terminal, wherein the PPPoE server comprises:
   a parsing module configured to parse a PPPoE error code generated during a dialup process;
   a conversion module configured to convert the PPPoE error code to an extended error code according to a PPPoE error code conversion rule table preconfigured on the PPPoE server;
   a transmission module configured to transmit the extended error code to the mobile terminal;
   the mobile terminal comprises:
   a reception module configured to receive the extended error code;
   an interpretation module configured to interpret the extended error code into a plain text according to a PPPoE error code conversion rule table preconfigured on the mobile terminal; and
   a display module configured to display the plain text to a user.

6. The error code conversion system according to claim 5, wherein the PPPoE server further comprises:
   an update synchronization module configured to, after updating the PPPoE error code conversion rule table configured on the PPPoE server, transmit a synchronization update message to the mobile terminal;
   the mobile terminal further comprises:
   an update module configured to update the PPPoE error code conversion rule table configured on the mobile terminal according to the synchronization update message.

7. The error code conversion system according to claim 6, wherein the mobile terminal further comprises:
   a dialup access module configured to complete a human-machine interaction and collect an account and a password inputted by the user performing PPPoE dialup;
   a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and
   a network management module configured to implement a WiFi connection, establish a data link and query a network status during the PPPoE dialup process.

8. The error code conversion system according to claim 5, wherein the mobile terminal further comprises:
   a dialup access module configured to complete a human-machine interaction and collect an account and a password inputted by the user performing PPPoE dialup;
   a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and
   a network management module configured to implement a WiFi connection, establish a data link and query a network status during the PPPoE dialup process.

9. A a Point-to-Point Protocol over Ethernet (PPPoE) server, comprising:
   a parsing module configured to parse a PPPoE error code generated during a dialup process;
   a conversion module configured to convert the PPPoE error code to an extended error code according to a PPPoE error code conversion rule table preconfigured on the PPPoE server; and
   a transmission module configured to transmit the extended error code to a mobile terminal.

10. The PPPoE server according to claim 9, further comprising:
   an update synchronization module configured to, after updating the PPPoE error code conversion rule table configured on the PPPoE server, transmit a synchronization update message to the mobile terminal.

11. A mobile terminal, comprising:
   a reception module configured to receive an extended error code;
   an interpretation module configured to interpret the extended error code into a plain text according to a Point-to-Point Protocol over Ethernet (PPPoE) error code conversion rule table preconfigured on the mobile terminal; and
   a display module configured to display the plain text to a user.

12. The mobile terminal according to claim 11, further comprising:
   an update module configured to update the PPPoE error code conversion rule table configured on the mobile terminal according to a synchronization update message.

13. The mobile terminal according to claim 12, further comprising:
   a dialup access module configured to complete a human-machine interaction and collect an account and a password inputted by the user performing PPPoE dialup;
   a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and
   a network management module configured to implement a WiFi connection, establish a data link and query a network status during the PPPoE dialup process.

14. The mobile terminal according to claim 11, further comprising:
- a dialup access module configured to complete a human-machine interaction and collect an account and a password inputted by the user performing PPPoE dialup;
- a state management module configured to manage various states of the PPPoE dialup process, trigger a PPPoE protocol stack to operate and be in charge of processing and executing PPPoE dialup instructions transmitted by the mobile terminal so as to complete management of the various states of the PPPoE dialup process; and
- a network management module configured to implement a WiFi connection, establish a data link and query a network status during the PPPoE dialup process.

* * * * *